United States Patent [19]
Spain et al.

[11] 3,716,564
[45] Feb. 13, 1973

[54] AZA ALIPHATIC ESTERS
[75] Inventors: Virginia L. Spain, Mountain View; John D. Diekman, Menlo Park, both of Calif.
[73] Assignee: Zoecon Corporation, Palo Alto, Calif.
[22] Filed: May 13, 1971
[21] Appl. No.: 143,183

[52] U.S. Cl. .................260/404, 260/410.9 R
[51] Int. Cl. .................................C08h 17/36
[58] Field of Search.............................260/404

[56] References Cited

FOREIGN PATENTS OR APPLICATIONS 682,517   3/1964   Canada ...............................260/404
697,388   11/1964  Canada ...............................260/404

OTHER PUBLICATIONS

Olumucki, Chem. Abstrats: 54: 282i–283a.

*Primary Examiner*—Lewis Gotts
*Assistant Examiner*—Ethel G. Love
*Attorney*—Donald W. Erickson

[57] ABSTRACT

Novel aza $\alpha$, $\beta$-unsaturated aliphatic esters prepared by the reaction of an aliphatic nitrile with a di-unsaturated aliphatic ester in the presence of mercuric nitrate followed by reduction with sodium borohydride useful for the control of insects.

11 Claims, No Drawings

AZA ALIPHATIC ESTERS

This invention relates to novel aza aliphatic esters and to the preparation and use thereof. More particularly, the novel aza aliphatic esters of the present invention are those represented by the following formulas I and II:

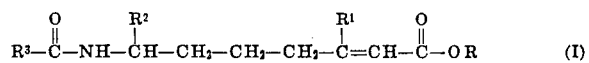  (I)

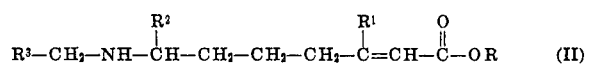  (II)

wherein each of R, $R^1$, $R^2$ and $R^3$ is lower alkyl.

The term "lower alkyl," as used herein, refers to a primary or secondary alkyl group having a chain length of one to six carbon atoms.

The compounds of formulas I and II are useful for the control of insects. They are applied using a suitable carrier substance, liquid or solid, such as water, acetone, cottonseed oil, xylene, mineral oil, silica, talc, resins, and the like. Other substances can be included, such as emulsifying agents and wetting agents, to assist in the application. Generally, the formulation will contain less than 95 percent by weight of the compounds of formulas I and II and usually less than 25 percent depending upon the efficiency of the applicator. A sufficient amount of a compound of formulas I or II is applied to provide from about 1.0 micrograms to about 50 micrograms per insect based upon the estimated population. Typical insects which can be controlled by means of the present invention are Diptera, Hemiptera, Coleoptera, Lepidoptera, Homoptera and Orthoptera. For example, lygus, mosquitos, roaches, aphids, beetles, weevils and moths. Without any intention of being bound by theory, the compound of formulas I and II are believed to be effective by reason of hormonal activity in that unlike conventional insecticides which are effective by reason of causing immediate death, the compounds of the present invention appear to be effective by reason of physiological changes caused in the treated insect, preferably the immature insect, which result in eventual death of the insect and/or inability of the treated insect to reproduce by reason of sterility or abnormal development.

The compounds of formulas I and II are prepared according to the following outlined synthesis ($R^{2'}$ is hydrogen or lower alkyl having a chain length of one to five carbon atoms).

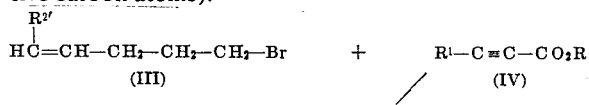 + 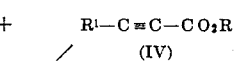

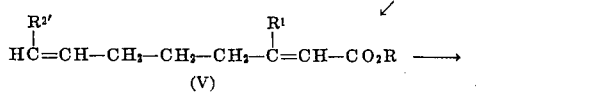 ⟶

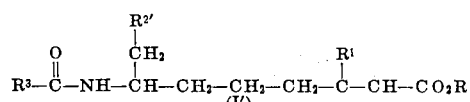  (I')

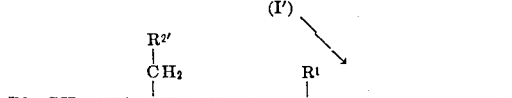  (II')

In the practice of the above outlined synthesis, an acetylenic ester of formula IV is alkylated using a copper complex of the bromide (III) to prepare the dienoic ester (V). The copper complex can be prepared by the reaction of cuprous iodide with a Grignard of the bromide (III) in the presence of an amine, such as pyrrolidine. The dienoic ester (V) is reacted with a nitrile of the formula $R^3$—CN in the presence of mercuric nitrate followed by reduction with sodium borohydride to yield the aza compound (I'). The reduction usually takes several hours for completion. A compound of formula I' is reduced using triethyloxonium fluoborate followed by treatment with sodium borohydride.

The following examples are provided to illustrate the present invention. Temperature in Centigrade.

EXAMPLE 1

To 2.76 g. of magnesium in ether is added 30 mg. of iodine. After cooling, ether is added to a total of 200 ml. and then 1 to 2 ml. of 1-bromo-4-pentene. After the reaction is started, additional 1-bromo-4-pentene is added slowly (total amount of bromide is 13.5 g.). After addition is complete, the mixture is stirred for 1 hour at room temperature.

To a mixture of cuprous iodide (22.8 g.), 200 ml. of ether and 16.8 g. of pyrrolidine, cooled to −25°, is slowly added the above prepared Grignard. The mixture is stirred at −25° until a negative Gilman test obtained (about 30–40 minutes). Then the reaction mixture is cooled to −80° and 9.8 g. of methyl but-2-ynoate is added over about 30 minutes. After an additional 30 minutes, the reaction is quenched with ethanol and poured into 600 ml. of saturated ammonium chloride. The mixture is then extracted with ether. The ether phase is washed with saturated ammonium chloride solution, dilute HCl, water and brine, dried over calcium sulfate and ether removed by spinning band distillation to yield methyl 3-methylocta-2,7-dienoate.

A mixture of 5 ml. of dry acetonitrile and 0.34 g. of mercuric nitrate is stirred for 30 minutes. Then the mixture is cooled (0°) and 0.168 g. of methyl 3-methylocta-2,7-dienoate is added. After about 20 minutes at room temperature, the mixture is cooled to 0° and then 0.10 ml. of 3M sodium hydroxide and 0.5M sodium borohydride in 3M sodium hydroxide are added. After about 30 minutes, the mixture is poured into saturated brine and extracted with ether. The ether layers are washed with brine, dried over sodium sulfate and evaporated to yield methyl 3,7-dimethyl-8-aza-9-oxodec-2-enoate.

EXAMPLE 2

To 5.0 g. of 3,3-dimethylvaleronitrile, under nitrogen, is added 5.8 g. of mercuric nitrate. After about 1 hour, 2.0 g. of methyl 3-methylocta-2,7-dienoate is added. The mixture is allowed to stand for 1 hour at room temperature. The mixture is cooled to 0° and then 12 ml. of 3M sodium hydroxide and 24 ml. of 0.5M sodium borohydride in 3M sodium hydroxide are added. The mixture is stirred at 0° for 1.5 hours. Salt is added and the mixture poured into brine. The mixture is extracted with ether. The ether layers are washed with brine until neutral, dried over sodium sulfate. The crude product is dissolved in ethanol and 456 mg. of sodium borohydride added at 0°. After standing overnight, the mixture is worked up by pouring into brine and extracting with ether to yield methyl 8-aza-9-oxo-3,7,11,11-tetramethyltridec-2-enoate.

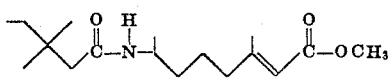

EXAMPLE 3

To a cooled mixture of 10 ml. of dry acetonitrile and 0.68 g. of mercuric nitrate is added 0.33 g. of methyl 3-methyl-octa-2.7-dienoate. The mixture is allowed to stand 3 hours and then 2 ml. of 3M sodium hydroxide and 3 ml. of 0.5M sodium boro-hydride in 3M sodium hydroxide are added. The mixture is left overnight and worked up by addition of salt, pouring into brine and extracting with ether. The ether phase is washed with brine, dried over sodium sulfate and evaporated to yield methyl 3,7-dimethyl-8-aza-9-oxodec-2-enoate.

EXAMPLE 4

To 15 ml. of dry butyronitrile, under nitrogen, is added 1.36 g. of mercuric nitrate. After about 45 minutes, 0.672 g. of methyl 3-methylocta-2,7-dienoate is added and the mixture left at room temperature for 24 hours. The mixture is cooled to 0° and then 4 ml. of 3M sodium hydroxide is added followed by 8 ml. of 0.5M sodium borohydride in 3M sodium hydroxide. After one hour, the mixture is worked up by adding NaCl, pouring into brine and extracting with ether. The ether phase is washed with brine until neutral, dried over sodium sulfate and evaporated to yield methyl 3,7-dimethyl-8-aza-9-oxododec-2-enoate.

EXAMPLE 5

A solution of 6.64 g, of triethyloxonium fluoborate, 7.26 g. of methyl 3,7-dimethyl-8-aza-9-oxodec-2-enoate in 30 ml. of dry methylene chloride is stirred at 25° for about 20 hours. Then the mixture is concentrated by evaporation under reduced pressure. The concentrate is dissolved in 40 ml. of ethanol and then 3.0 g. of sodium borohydride is added slowly, with stirring, at 0°. After addition is complete, stirring is continued for about 18 hours at 25°. The mixture is poured into water and extracted with ether. The ether extracts are washed with water, dried over magnesium sulfate and evaporated to yield methyl 3,7-dimethyl-8-azadec-2-enoate which can be purified by chromatography.

EXAMPLE 6

The process of Example 1 is repeated using 1-bromo-4-hexene in place of 1-bromo-4-pentene to yield methyl 3-methylnona-2,7-dienoate which is converted into methyl 3-methyl-7-ethyl-8-aza-9-oxodec-2-enoate. Methyl 3-methyl-7-ethyl-8-azadec-2-enoate is prepared using the process of Example 5.

Each of methyl 3-methylocta-2,7-dienoate and methyl 3-methylnona-2,7-dienoate is reacted with propionitrile using the procedure of Example 4 to prepare methyl 3-methyl-7-ethyl-8-aza-9-oxo-undec-2-enoate and methyl 3,7-dimethyl-8-aza-9-oxoundec-2-enoate. By use of the process of Example 5, methyl 3-methyl-7-ethyl-8-azaundec-2-enoate and methyl 3,7-dimethyl-8-azaundec-2-enoate are prepared.

EXAMPLE 7

Each of ethyl but-2-ynoate and methyl pent-2-ynoate is used in place of methylbut-2-ynoate in the process of Example 1 to prepare ethyl 3-methylocta-2,7-dienoate and methyl 3-ethyl-octa-2,7-dienoate and then ethyl 3,7-dimethyl-8-aza-8-oxodec-2-enoate and methyl 3-ethyl-7-methyl-8-aza-9-oxodex-2-enoate, respectively. Reduction following the procedure of Example 5 affords ethyl 3,7-dimethyl-8-azadec-2-enoate and methyl 3-ethyl-7-methyl-8-azadec-2-enoate.

What is claimed is:

1. A compound selected from those of the following formulas (I) and (II):

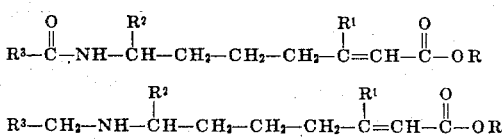

wherein each of R, R¹, R², R² and R³ is lower alkyl.

2. A compound of formula I according to claim 1 wherein each of R¹ and R² is methyl or ethyl.

3. A compound according to claim 2 wherein R is lower alkyl of one to three carbon atoms.

4. A compound according t claim 3 wherein R¹ is methyl.

5. A compound according to claim 4 wherein R² is methyl.

6. A compound of formula II according to claim 1 wherein each of R¹ and R² is methyl or ethyl.

7. A compound according to claim 6 wherein R is lower alkyl of one to three carbon atoms.

8. A compound according to claim 7 wherein R¹ is methyl.

9. A compound according to claim 8 wherein R² is methyl.

10. A compound according to claim 3 wherein R³ is primary lower alkyl.

11. A compound according to claim 7 wherein R³ is primary lower alkyl.

* * * * *